Figure 5:
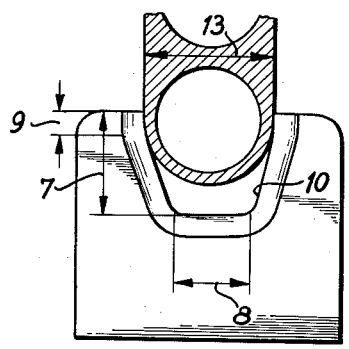

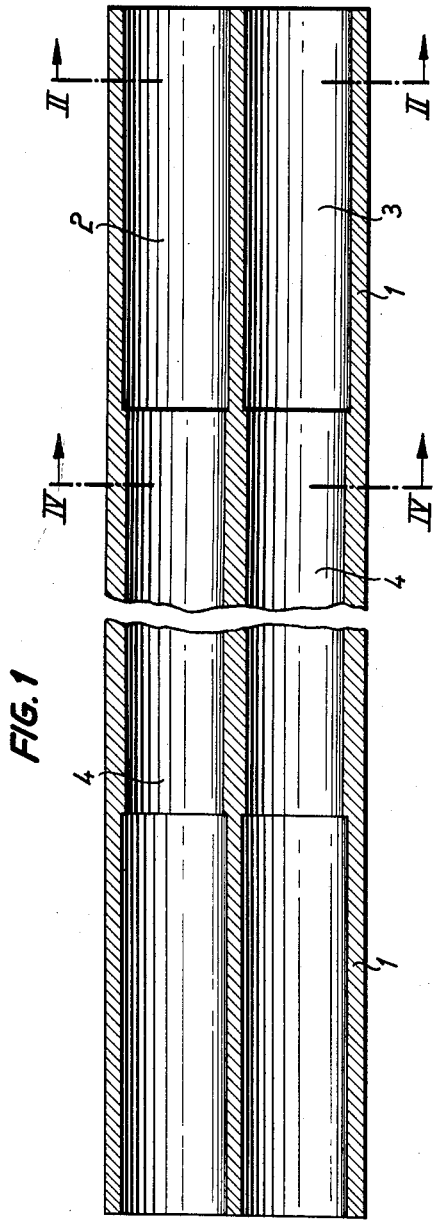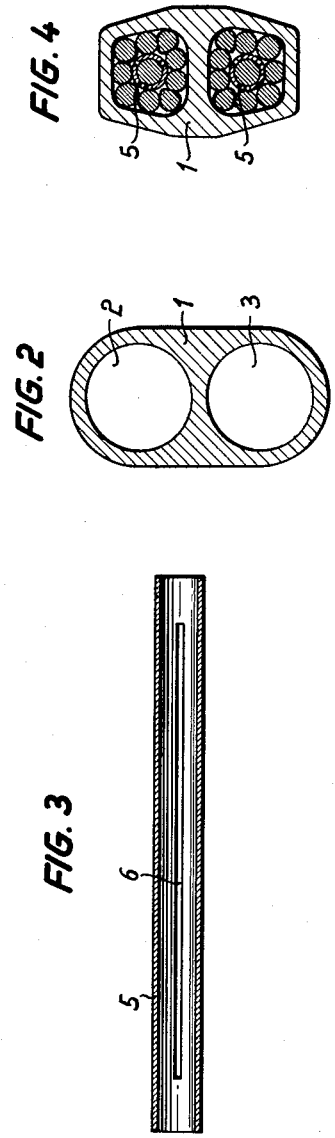

Jan. 2, 1962 M. GERLACH ET AL 3,015,685
CONNECTION OF TWO SIDE BY SIDE ELECTRIC CABLES
Filed Feb. 9, 1959 6 Sheets-Sheet 2

INVENTORS
M. Gerlach
W. Forster
By Glascock Downing Seebold
ATTYS.

Jan. 2, 1962 M. GERLACH ET AL 3,015,685
CONNECTION OF TWO SIDE BY SIDE ELECTRIC CABLES
Filed Feb. 9, 1959 6 Sheets-Sheet 3

INVENTORS
M. Gerlach
W. Forster
BY Glascock Downing Seebold
ATTYS.

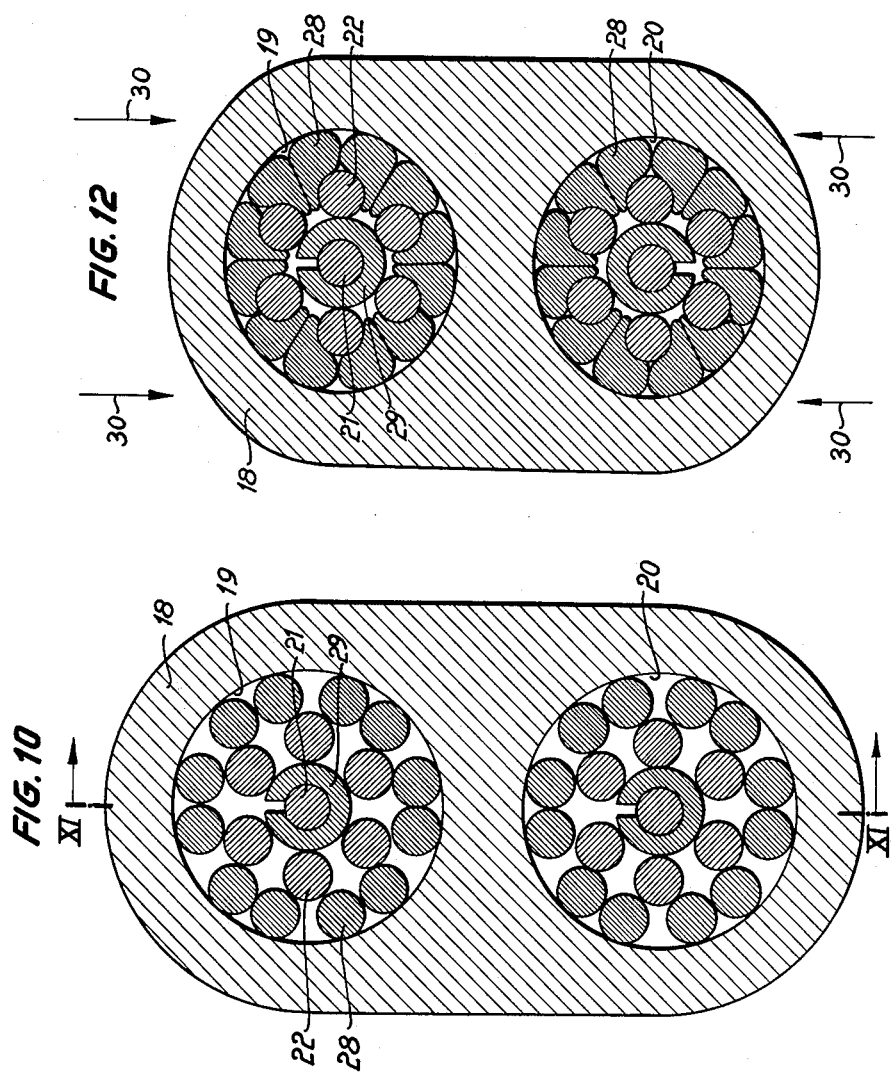

Jan. 2, 1962   M. GERLACH ET AL   3,015,685
CONNECTION OF TWO SIDE BY SIDE ELECTRIC CABLES
Filed Feb. 9, 1959   6 Sheets-Sheet 5

INVENTORS
M. Gerlach
W. Forster
BY
ATTYS.

Jan. 2, 1962　　　M. GERLACH ET AL　　　3,015,685
CONNECTION OF TWO SIDE BY SIDE ELECTRIC CABLES
Filed Feb. 9, 1959　　　　　　　　　　　　　6 Sheets-Sheet 6

INVENTOR
M. Gerlach
W. Forster
ATTYS.

3,015,685
CONNECTION OF TWO SIDE BY SIDE
ELECTRIC CABLES
Martin Gerlach and Wilhelm Forster, Schwabach, near Nurnberg, Germany, assignors to Bayerische Schrauben- und Federn-Fabriken Richard Bergner, Schwabach, near Nurnberg, Germany
Filed Feb. 9, 1959, Ser. No. 792,080
Claim priority, application Germany Apr. 23, 1958
3 Claims. (Cl. 174—90)

The invention is in respect of a method and appliances for connecting together two adjacent-lying electricity conductor cables, preferably aluminum cables and steel-reinforced aluminium cables, by means of a double socket, the two drillings of which lie parallel next to each other.

The invention has in view the creation of a joint of great mechanical strength between the two cables as well as the provision of good conditions of electrical contact. The invention further aims at achieving a high degree of compactness in the cable connection, especially at the cable-end, by means of which, among other things, any penetration of moisture into the cable-end is rendered difficult.

The invention further aims at creating a joint of low weight and at employing thin-walled connecting sockets. The reason why sockets having a thin walling are aimed at is, inter alia, in order that small pressure forces shall be sufficient for deforming the connector socket in order to establish the joint, thereby making it possible for the job of joining the two conductor cables to be performed on the assembly site, using manually operated equipment.

The invention consists primarily in the fact that a socket made of the same material as the cable is employed, aluminum for example, the wall-thickness of which socket along at least one portion of the circumference of each drilling is smaller than half the diameter of the drilling, and that, along almost the whole of its length at least, the socket is compressed in a circumferential direction by means of pressure exerted on it externally. For joining aluminium cables or steel-aluminium cables, commercial aluminium is selected as the material from which the sockets shall be made rather than any special aluminium alloy.

It is a useful measure to dimension the socket's wall-thickness along one portion of the circumference of a drilling at least, so that it is less than ⅗ of half the diameter of the drilling. In order to achieve a firm fit on the part of the socket, its length should be selected, preferably, so as to be at least equal to 10 times the diameter of its drillings. The compression of such sockets can be effected in stages by means of clamping jaws the width of which is only a fraction—for example a third to a tenth—of the length of the socket. Thus, the job of compressing can, generally speaking, be done with the aid of manually operated tools.

The joint as per the invention is improved still further if a spreader is introduced into a cable end after the latter has been pushed into the socket and prior to the socket's being compressed. The length of the spreader should as a matter of preference amount to only part of the length of the socket.

The invention further relates to the special design given to the tools which are used in its execution, to the special constructional details of the connecting socket, and to the special shape of the aforementioned spreader.

Figure 7:
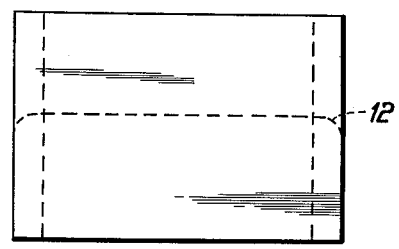
Figure 6:
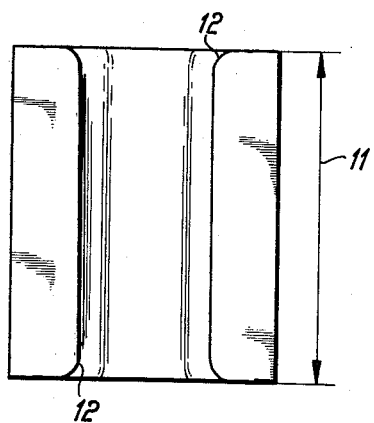
Figure 21:
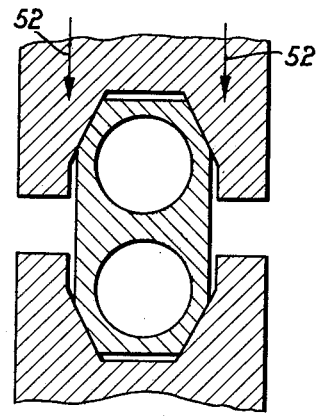
Figure 22:
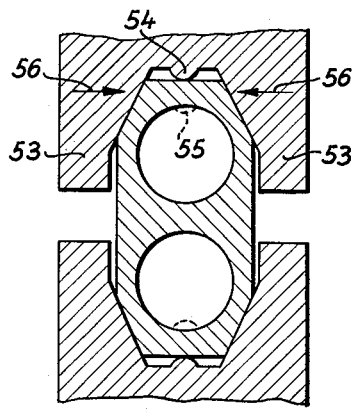
Figure 23:
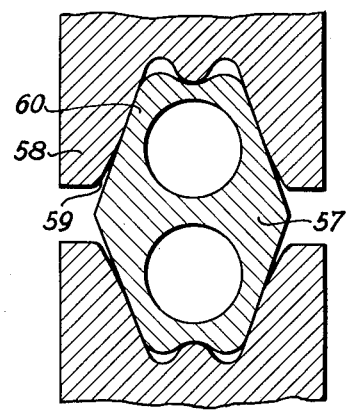
Figure 19:
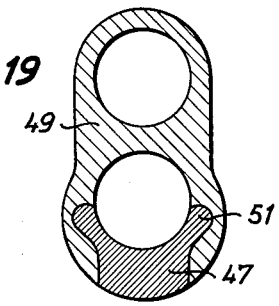
Figure 8:
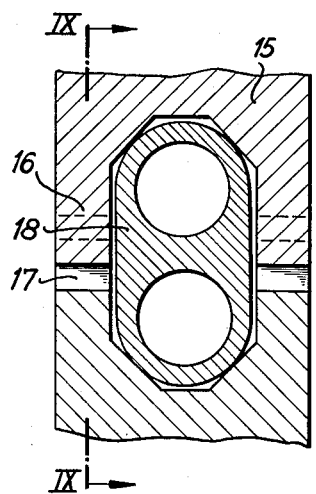
Figure 9:
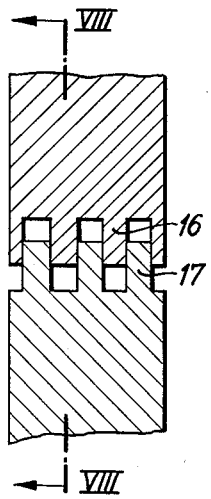
Figure 20:
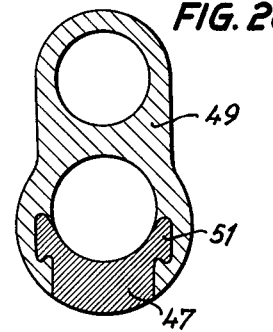
Figure 11:
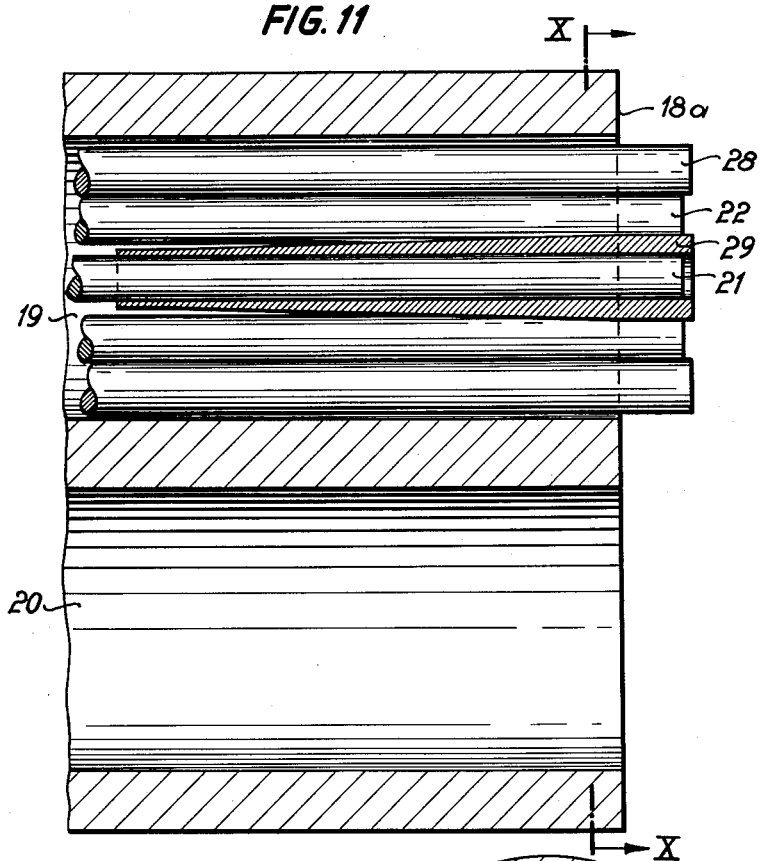
Figure 13:
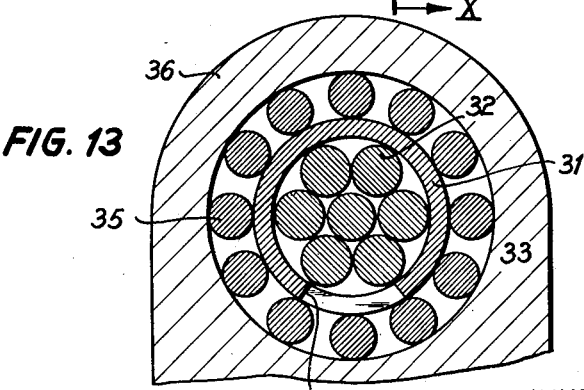
Figure 14:
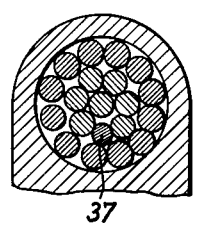

The invention will now be further described with reference to the accompanying drawings which illustrate the method to which the invention relates and in which:

FIGURE 1 shows a longitudinal section through a connecting socket of the type employed, FIGURE 2 is a section along the line II—II of FIGURE 1, FIGURE 3 shows a spreader whose use is recommended, FIGURE 4 shows a section through the compressed socket with the cables compressed, such as they appear after compression at the position marked IV—IV in FIGURE 1, FIGURE 5 shows a clamping tool for producing the compressed state as shown in FIGURE 4, FIGURE 6 is a plan view of the clamping tool shown in FIGURE 5, FIGURE 7 is a left-hand side view of the contents of FIGURE 5, FIGURE 8 is another type of pressing tool as per line VIII—VIII of FIGURE 9, FIGURE 9 is a section along line VIII—VIII of FIGURE 8, FIGURE 10 illustrates the use of a spreader in the cable as per X—X of FIGURE 11, FIGURE 11 is a section along line XI—XI of FIGURE 10, FIGURE 12 shows the socket and cable as per FIGURE 10 after having been compressed, FIGURE 13 shows another arrangement of a spreader in the cable, FIGURE 14 shows a further development of a cable with spreader, FIGURES 15 to 18 show further developments of spreaders, FIGURES 19 and 20 show cross sections through differently styled connecting sockets, and FIGURES 21 to 23 show further executions of connector sockets with tools adapted for same.

The socket 1 as per FIGURES 1 and 2 has, at both ends, two drillings 2 and 3. The length of the drillings 2 and 3 is approximately 80 mm.; the two drillings at the ends of the socket are connected to each other by drillings 4 of slightly smaller diameter. The length of the middle drillings 4 is about 400 mm. The socket is suitable for joining together steel-aluminium cables of a diameter of 18.9 to 19.2 mm. Consequently, the drillings 2 and 3 have a diameter of about 21 mm., whilst the drillings 4 are of a diameter of approximately 19.5 mm. The socket is made of ordinary commercial, i.e. almost pure, aluminium. There is no necessity to use expensive aluminium alloys. When two cables require to be connected together, the cable coming in from the right-hand side is introduced into the upper drilling 2 for example and pushed so far in until the cable end reaches the left-hand end, say, of the connecting socket 1. The end of the other cable coming in from the left is then introduced into the lower drilling from the left. After they have been passed inside the connecting socket, the ends of the two cables have spreaders pushed into them, such as for example, the steel bushings as per FIGURE 3.

Such a bushing then surrounds the inner wires of the cable which is being joined. The bushing 5 is provided, along the major portion of its length, with three longitudinal slits 6 evenly spaced out over its circumference, so as to enable it to be flexibly compressed concentrically along the major portion of its length. The length of the bushing amounts to about 110 mm., i.e. a little more than the length of the drillings 2 and 3. The compressing is done by a pair of clamping jaws. A clamping jaw which is suitable for this purpose is represented in FIGURES 5 to 7. The function of this clamping jaw is to compress the connector socket as per FIGURES 1 and 2. The compression produces a cross section of the connector socket and cable such as that shown in FIGURE 4. The depth 7 of the groove amounts to about 20 mm. Its bottom surface 8 is approximately 8 to 16 mm. wide and the vertical portion 9 of the groove's walling 10 is about 3.5 mm. high. The width of the top opening 13 is 26.5 mm.

The length 11 (FIGURE 6) of the clamping jaw amounts to about 66 mm., i.e. only ⅛ of the length of the connector socket. Thus, compressing is done in stages, this being the reason why the ends of the pressure facings have large rounded-off portions 12.

The FIGURES 8 and 9 illustrate a somewhat differently styled tool. The pressure jaws 15 shown here interlock with each other with their prongs 16 and 17 finger-wise, so that, when the two pressure jaws are brought together, the longitudinal sides of the socket 18 are prevented from giving way by an undue amount. Thus, the execution as depicted, of the two clamping jaws ensures that the cables which are being gripped shall be compressed by compressing the socket in a circumferential direction, and it prevents any premature, undue, lateral flow on the part of the material of which the socket is made.

In the lengthwise drillings 19 and 20 of a connecting socket 18 as per FIGURES 10 and 11 which corresponds substantially to the examples of execution as given in FIGURES 1 to 3, and FIGURE 8 too, are the ends of two steel-aluminium cables. The cable has a middle steel wire 21 and six steel wires 22 lying around the latter. Around the circle formed by the steel wires 22 there lies a further ring of twelve aluminium wires 23. Fitted around the middle wire 21 there is a lengthwise slitted, spreader bushing 29 the walling thickness of which diminishes as from the extreme end 18a (FIGURE 11) of the connector socket inwards. The spreader bushing 29 has forced the wires 22 and 28 apart somewhat. The connector socket 18 is compressed in stages longitudinally along its cross section along its entire length, cf. arrows 30 in FIGURE 12. As a result of this, the interior cross section of the drillings 19 and 20 diminishes, in the course of which the aluminium wires 28 become deformed in accordance with the amount of space still available to them, whilst the steel wires 21, 22 around the spreader bushing 29—also made of steel—substantially retain their original shape. The aluminium of the aluminium wires penetrates well between the steel wires, and so there ensues a high volumetric efficiency (cf. FIGURE 12). In the region outside the spreader bushing 29 the clear space in drillings 19 and 20 is more severely deformed than in the vicinity of the spreader bushing 29, so that an expansion of the interior cross section would have to take place if the cable were to be pulled through the connector socket. Since in order for this to happen, an expansion on the part of the material of which the socket is made would be necessary, and not a bending on the part of same, the joint, once it has been made, is extremely durable. If the connector socket, in the region of the spreader bushing 29 too, is to be brought into the same outer shape as outside the region of the spreader bushing, then greater forces will be needed, in order to effect this, than outside the spreader bushing's sphere of influence, but, in compensation for this, a greater cable-compression will be achieved in the region of the spreader bushing too, in other words, the material of which the aluminium wire is made will be forced between the individual steel wires on a much larger scale than in the rest of the connector socket. Then, in the vicinity of the spreader bushing 29, an especially strong flow may, under certain circumstances, be set up in the material of which the socket is made, in the socket's longitudinal direction. The tools can also be designed of such a shape that, in its finish-compressed state, the connector socket is given a polygonal shape such as a hexagonal or octagonal shape.

FIGURE 13 illustrates the employment of a steel bushing 31 of larger diameter, which embraces all the steel wires 32 and 33. The slit in the spreader bushing at position 34 is kept wider than was the case in the first example of execution. It may in fact be sufficient to insert a bushing segment of about 180° or less. When the socket is compressed the steel wires 33, 32 retain their shape substantially, whilst the aluminium wires 35 of the outermost ring fill up fairly completely the constricted space between the steel bushing 31 and the connector socket 36.

FIGURE 14 shows a form of execution in which the spreader has the form of a solid pin 37. Such a pin may be conical in shape. However it is frequently sufficient for it to be sharpened to a point only at the end which is to be introduced first.

Figure 16:
Figure 15:

FIGURES 15 and 16 illustrate a further example of execution of a spreader which can be fitted. This spreader consists of a longitudinally-slitted spreader bushing 38 having six longitudinal ribs 39 on its circumference, which as FIGURE 16 shows, wind around the tubular spreader bushing 38 with a pitch corresponding to the windings in the cable. This form of execution too can be so arranged that the cross section of the spreader bushing 38 and its longitudinal flange 39 diminishes from one end to the other. In every instance the spreader bushing takes, in its middle portion, a steel wire 40. The six wires 41 disposed all around outside may be of steel or aluminium depending on the composition of the cable.

Figure 17:
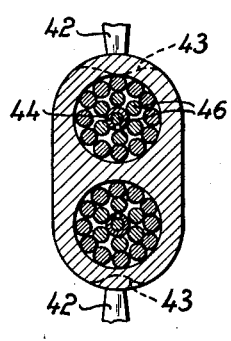

The arrangement as per FIGURE 17 substantially corresponds to that of the first examples of execution and illustrates the method according to the invention in combination with a longitudinal indentation. In this instance, press dies 42 are applied at top and bottom, which imprint two longitudinal indentations 43 in the connector socket. As a result of this there is an additional reduction in the socket's cross section. This longitudinal indentation may be made after compression using tools as per FIGURES 5 to 7.

Figure 18:
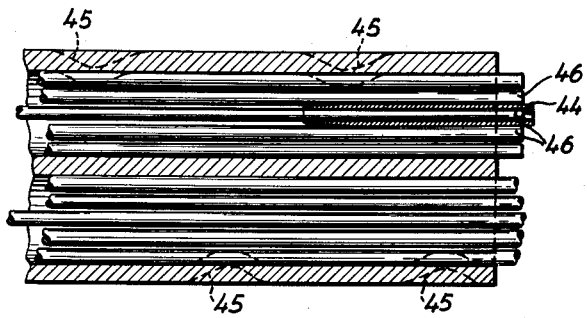

FIGURE 18 illustrates the application of the method as per the invention with additional longitudinal indentation. Here a longitudinally slitted spreader bushing 44 has been pushed over the middle wire of the steel wires 43. After compression using tools of the kind represented in FIGURES 4 to 7, additional cross-wise indentations 45 are then impressed at top and bottom, as a result of which the longitudinal axes of the aluminium and steel wires are also deformed into an undulating shape and so the fit on the part of the connector socket is made still firmer.

FIGURES 19 and 20 show sockets with insertable wedges which are used when one of the two cables being joined is in one continuous length. For such a purpose as this the insertable wedges 46, 47 (FIGURE 20) can be pushed in and out. They are first of all removed in order to enable the sockets 48, 49 to be pushed over the continuous length of cable with their open ends. Then the sliding wedge is pushed-in in a longitudinal direction, and the socket is then compressed in the customary manner. The dovetail-like fit which the flanges 50 and 51 respectively make with the socket is not only for the purpose of giving both components a mutual hold prior to pressing, but it also assists the fluid connection between socket and wedge during the pressing operation. In order to cater for the unusual contingency in which two cables in one continuous length each, are required to be joined together, both drillings can, obviously, be equipped with sliding wedges.

With the cross section of socket as depicted in FIGURE 21, the socket's cross section is not rounded-off at top and bottom, but constructed in a hexagonal shape. This has the advantage that, when the pressure is exerted in the direction of the arrows 52, a wedge-like clamping action is set up directed inwards from left and right, which is more powerful than with the oval shape of cross section.

As a variant on FIGURE 21, FIGURE 22 shows, on the clamping jaws, at the base of the forked prongs 53, a longitudinal bead 54. This produces, when the two press jaws close together, an indentation such as that depicted at 55. The indentation prevents the outermost wires in the cable, when the socket is compressed, from forming a pressure-proof tube which would make it difficult for the inner wires to become deformed if not rendering it impossible for them to do so. The indentation 55 forms as soon as the press jaws start coming together, that is to say, before the hollow spaces between the wires have been completely filled with material. This means that, as a result of the wedging action by the clamping jaws on the socket, the compressing operation exercises a very strong upsetting effect in the direction of the arrows 56. Although the compressed connector is ultimately similar to the one shown in FIGURE 17, a better compressing action is achieved using tools as per FIGURE 22.

FIGURE 23 shows a socket which has a thick cross section across its middle portion 57. The prongs 58 are cut back at 59 as against the socket's profile. Upsetting first occurs in the portion 60 so that, at this point, a desirably powerful lateral pressure is exerted on the cables.

Any deviations from the examples of execution depicted are possible within the framework of the invention. For instance, several spreaders may be used at one cable-end.

It is a known practice for terminal caps to be fitted on to the cable-end in the course of jointing in cable-jointing sleeves, these terminal caps being usually made of aluminium and often introduced into the connector socket along with the cable. The cap serves to close off the end of the cable against moisture. The spreaders as per the invention may be applied jointly wih such caps, may even be joined to the spreaders before being fitted to the cable. If the caps are taken into the connector socket along with the cable, they will be compressed together with the connector socket. The pushed-in spreaders may in any event be transversally grooved. With the sleeve-shaped spreaders as depicted in FIGURES 3, 11, and 18, the transverse grooves may be applied both inside and out.

It is of particular advantage to make the inserted spreaders from some non-corrosive material, preferably rustless steel, for if this is done, not only is the hardness of this steel put to good effect but also the property of its being rustproof is beneficial. The invention can also be applied to the jointing of cables other than those made of steel and aluminium, such as, for example, copper cables, pure aluminium cables or even pure steel cables.

We claim:

1. Means for joining together the two adjacent ends of stranded electrical cables comprising, an elongated socket member of one of the metals of the class including aluminum, aluminum alloy and copper having a length of more than ten times the diameter of each of the cables, said member having two parallel normally cylindrical bores extending therethrough and through each of which a cable end portion extends, the wall thickness of said member, at least over a part of the periphery of each bore, being no more than three-fifths of the normal bore radius, the central portion of the sleeve having a bore radius smaller than the terminal portion of the bore, a substantially elongated rigid compressible spreader member lying between the strands of each cable end portion and entirely within the terminal portion of the bore adjacent to the cable end, the walls of said bores being compressed over the cables along substantially the entire length of the socket member to compress the spreader members and wedge the cables within the bores.

2. Joining means as defined in claim 1, in which the wall of each bore is compressed against a cable end portion to deform the bore, spreader member and cable therewithin into substantially octagonal cross-section.

3. Joining means as defined in claim 1, in which the spreader member comprising an elongated hollow tube having at least one longitudinally extending slit in its wall.

References Cited in the file of this patent

UNITED STATES PATENTS

| 1,599,356 | Auspitzer | Sept. 7, 1926 |
| 2,307,216 | Graham | Jan. 5, 1943 |
| 2,734,933 | Klosin | Feb. 14, 1956 |
| 2,959,436 | Duda | Nov. 8, 1960 |

FOREIGN PATENTS

| 366,365 | Great Britain | Feb. 4, 1932 |
| 602,963 | Great Britain | June 7, 1948 |